July 30, 1957 C. K. GLAZE 2,800,740
TREBLE FISHHOOKS
Filed July 12, 1954
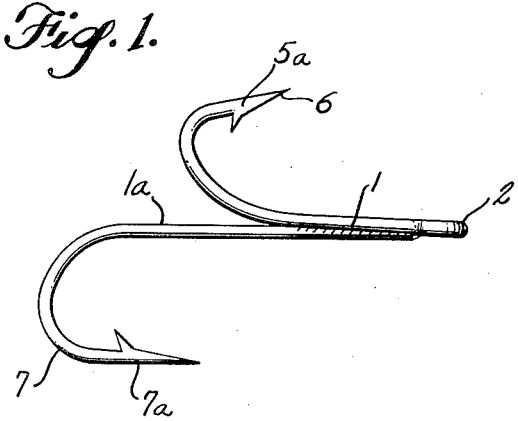
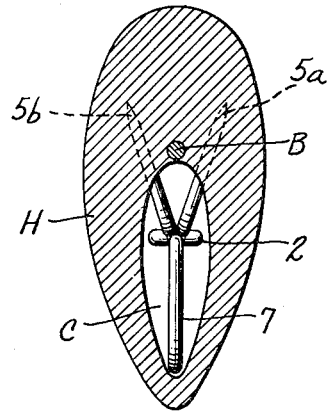
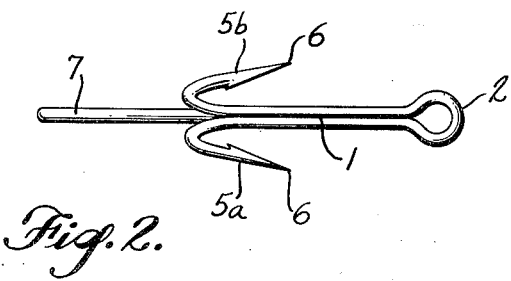
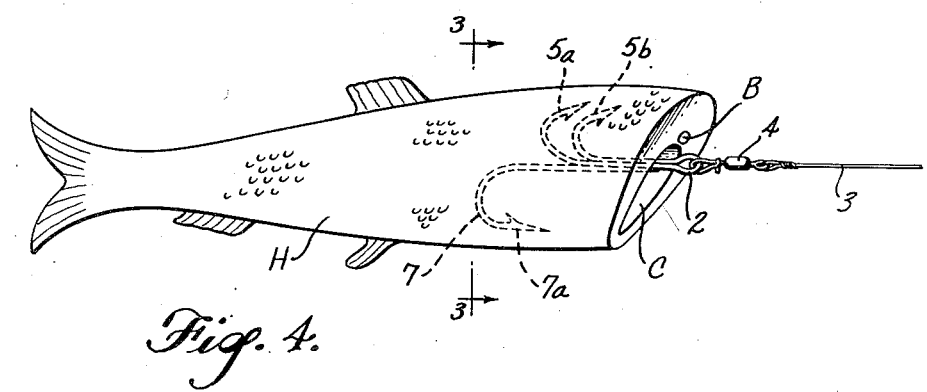
INVENTOR.
CECIL K. GLAZE
BY Reynolds, Beach & Christensen
ATTORNEYS

United States Patent Office 2,800,740
Patented July 30, 1957

2,800,740
TREBLE FISHHOOKS

Cecil K. Glaze, near Olympia, Wash.

Application July 12, 1954, Serial No. 442,620

2 Claims. (Cl. 43—44.82)

The present invention concerns a treble fishhook, one which is particularly and specifically designed for use in "mooching," although it can be used in trolling or in other styles of fishing.

Mooching is a style of sport fishing, used primarily in the Pacific Northwest for catching large salmon, in which a herring, decapitated in a particular manner in order to cause it to spin, is permitted to sink in the water and then is raised from time to time. In spinning, it simulates an injured or wounded herring, and so attracts the salmon to it. Heretofore in mooching, the hooks have been attached externally to the bait herring, sometimes near the forward end thereof, and always near the rear end, or trailing behind the tail of the herring, but always exposed to some degree. Salmon are often lost because, warned by the protruding hooks, they do not seize the bait fully, or shake it loose before it can be set. By the use of the present invention the hook is practically completely concealed within the body cavity of the herring, the herring is strongly engaged at the opposite sides of its backbone, its belly is held distended, and the points of the treble hook are completely concealed within the confines of the herring, and do not protrude therefrom to warn the salmon until the herring has been swallowed. As a result the salmon is securely hooked, and it becomes virtually impossible for the salmon to disengage the hook and to get away.

The provision of a treble hook having the advantages indicated above is the general object of this invention. More specifically it is an object to provide a treble hook in which there are two points arranged to penetrate the flesh of the herring at opposite sides of the backbone, and to incline outwardly, together with another hook, usually of larger size, that is, of larger arc and of greater length of shank, which extends in a direction to distend the body cavity, so that by the cooperative relationship of the three hooks the cut herring is well and strongly supported and engaged, yet all hooks are concealed.

The invention will be better understood from the following specification, taken in connection with the accompanying drawings, and will be defined in the appended claims.

Figure 1 is a side elevational view of the hook,

Figure 2 is an edge view from a viewpoint 90° removed from that of Figure 1,

Figure 3 is a cross-sectional view of a herring taken on the line 3—3 of Figure 4, illustrating the manner in which the treble hook of the present invention is engaged therein, and Figure 4 is a general isometric view from the side, to a somewhat smaller scale, also showing the hook engaged in the herring.

The hook includes a shank portion 1, formed at one end with an eye 2 or any equivalent means for securement of the hook at the end of a leader 3, usually through the intermediary of a swivel 4. Extending outwardly from the shank portion 1 in each of two radial planes are two hooks 5a and 5b, which are shown of like size and shape, and located equidistantly from the eye 2. The planes of these twin hooks are disposed relatively at an acute angle, as shown in Figure 3, rather than at an obtuse angle as in the usual treble hook. Preferably their points 6 are inclined, in the planes of the respective hooks, outwardly with relation to the shank portion 1.

A third hook 7 also is located in a plane radially of the shank portion 1, but is located somewhat more distantly from the eye 2 than are the twin hooks 5a and 5b. Also, and preferably, the hook 7 is somewhat larger in size than the twin hooks 5a and 5b. Its point includes a portion 7a which is directed generally parallel to the shank portion 1, or to the extension 1a thereof by which the hook 7 is supported. Furthermore, while the hook 7 is directed oppositely from the hooks 5a and 5b its plane bisects the acute angle defined between the planes of the hooks 5a and 5b, also as seen best in Figure 3.

In résumé, the two hooks 5a and 5b are usually somewhat smaller than the hook 7, and are directed oppositely from the hook 7, but lie in planes at an acute angle, which angle is bisected by the plane of the larger hook 7. The hook 7 is somewhat more distant from the eye end 2 of the shank portion 1 than are the hooks 5a and 5b, and whereas the points 6 of the hooks 5a and 5b are directed somewhat outwardly, the point portion 7a of the hook 7 is not desirably directed outwardly, but lies generally parallel to the shank portion.

A bait herring H, in being prepared for use, is decapitated with a double bevel cut; that is to say, the plane of the knife is at an angle to the backbone B of the herring, both transversely and longitudinally of the extent of the herring. The double bevel thus formed at the forward end of the bait herring is what causes it to spin. Its body cavity C is cleaned out, to the extent necessary to enable the treble hook of the present invention to be inserted through the forward end of the cavity C towards or to the bottom of this cavity. In inserting the hook the points 5a and 5b are kept uppermost or toward the back of the herring, and the hook 7 lowermost or toward the belly portion, as is seen in Figures 3 and 4. Having inserted the hook thus to an extent where the hook 7 distends the belly, and the twin hooks 5a and 5b are sufficiently inwardly of the front end cut that they are not likely to pull out, the hook is then drawn forwardly and somewhat upwardly. The outward pointing of the hooks 5a and 5b directs the hook as a whole upwardly, when it is drawn forwardly, and draws the point 7a away from the soft belly, preventing penetration thereof. The outwardly directed points 6 of the twin hooks penetrate the solid flesh close to the opposite sides of the backbone B, while still leaving the hook 7 in position to maintain the belly of the herring well distended, but with no portion of the hook 7 protruding. The hook so engaged is shown in Figures 3 and 4.

Now when the herring is drawn through the water it will be kept distended by the hook 7, the hooks 5a and 5b will furnish a secure hold upon the herring, and the shank portion 1 will tend to steady the herring with relation to the hook, notwithstanding the open forward end of the cavity C. The herring will spin in the desired manner, and the hook is substantially completely concealed. When a salmon is attracted to the herring it will preliminarily mouth and eventually swallow the herring whole, since there are no protruding hooks to warn the salmon that the herring is bait. Eventually the salmon's stomach will contract upon the herring, and the points, especially the point 7a, will protrude, but by this time the salmon is thoroughly and completely hooked and cannot get away. When landed, the only way to disengage the hook from the salmon is to clean the salmon, and so it is the custom, when using the hooks of this invention, simply to cut or to disengage the leader 3 from the remainder of the tackle and to leave the salmon with the hooks inside it until the fisherman has landed and can clean this and other salmon which he may catch, all at one time.

I claim as my invention:

1. A fishhook for insertion into the head end of the body cavity of a decapitated bait fish, comprising a shank formed at its forward end for securement to a leader, two hooks of like size and shape directed rearwardly in respective planes forming an acute angle adjacent the rear end of the shank and curved forwardly at their rear ends, and a third hook disposed in a plane substantially bisecting the angle between the planes including the first two hooks, located farther rearwardly than the first two hooks, said third hook being curved outwardly in the direction opposite from the latter and having its pointed tip directed forwardly generally parallel to the shank, said third hook having a larger arc than the arcs of the first two hooks, so that its pointed tip is spaced farther from the shank than are the pointed tips of the first two hooks.

2. A fishhook as in claim 1, wherein the pointed tips of the first two hooks are directed outwardly, as well as forwardly, at an angle to the shank.

References Cited in the file of this patent

UNITED STATES PATENTS

| Number | Name | Date |
|---|---|---|
| 356,661 | Pfaff | Jan. 25, 1887 |
| 471,548 | Haviland | Mar. 29, 1892 |
| 620,896 | Edgar | Mar. 14, 1899 |
| 1,110,246 | Viers et al. | Sept. 8, 1914 |
| 2,193,103 | Kowalski | Mar. 12, 1940 |
| 2,208,069 | Broz | July 16, 1940 |
| 2,492,557 | Deimler | Dec. 27, 1949 |
| 2,514,527 | Verhota | July 11, 1950 |
| 2,703,947 | Petrosek et al. | Mar. 15, 1955 |

FOREIGN PATENTS

| Number | Country | Date |
|---|---|---|
| 4,078 | Great Britain | 1887 |
| 43,038 | Sweden | Sept. 5, 1917 |